United States Patent
Tatsuda et al.

(10) Patent No.: US 7,311,514 B2
(45) Date of Patent: Dec. 25, 2007

(54) DIE PLATE

(75) Inventors: Osamu Tatsuda, Takasago (JP);
Atsushi Shigeno, Takasago (JP);
Nobuki Nagami, Takasago (JP);
Masashi Konno, Takasago (JP);
Hiroyuki Takeda, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 186 days.

(21) Appl. No.: 11/076,876

(22) Filed: Mar. 11, 2005

(65) Prior Publication Data
US 2005/0221102 A1 Oct. 6, 2005

(30) Foreign Application Priority Data
Mar. 31, 2004 (JP) ............................ 2004-102781

(51) Int. Cl.
*B29C 47/12* (2006.01)
(52) U.S. Cl. ....................... 425/464; 425/463
(58) Field of Classification Search ............... 425/464, 425/463, 311, 313, 1
See application file for complete search history.

(56) References Cited

U.S. PATENT DOCUMENTS

| | | | |
|---|---|---|---|
| 3,452,394 A | | 7/1969 | McNeal, Jr. |
| 4,088,433 A | * | 5/1978 | Simpson ................. 425/464 |
| 4,720,251 A | * | 1/1988 | Mallay et al. ............. 425/67 |
| 5,620,130 A | | 4/1997 | Schneider et al. |
| 5,761,787 A | * | 6/1998 | Kragle et al. ............... 29/418 |
| 6,521,353 B1 | * | 2/2003 | Majagi et al. .............. 428/565 |
| 2005/0035483 A1 | * | 2/2005 | Jackson et al. ............. 264/142 |

FOREIGN PATENT DOCUMENTS

| | | | |
|---|---|---|---|
| EP | 1 116 570 A2 | | 7/2001 |
| JP | 60190526 | * | 9/1985 |
| JP | 5-124035 | | 5/1993 |

OTHER PUBLICATIONS

JPO Machine Translation of JP 05-124035, Published May 21, 1993.*

* cited by examiner

*Primary Examiner*—Robert B. Davis
*Assistant Examiner*—Marissa W Chaet
(74) *Attorney, Agent, or Firm*—Oblon, Spivak, McClelland, Maier & Neustadt, P.C.

(57) ABSTRACT

In a die plate having a hardened surface for sliding a knife, a plurality of WC alloy plates 1b are diffusion-bonded to a base metal 2b, whereby the hardened surface h is formed. A plurality of nozzle holes 4a, 4a . . . are formed on each of the WC alloy plates 1b. Each of the WC alloy plates 1b is formed into a shape having a thickness of 2.5 mm or more and two adjacent edges 20 mm or more in length, wherein each edge is 200 mm or less in length. The die plate has high freedom in an arrangement of nozzle holes to enable a close arrangement of a number of nozzle holes, has an extended life with hardly causing dropping-off of a member constituting a hardened surface, and can be produced with a minimized number of processes.

4 Claims, 2 Drawing Sheets

DIE PLATE

BACKGROUND OF THE INVENTION

1. Field of the Invention

The present invention relates to a structure of a die plate for a granulating machine of resin pellets.

2. Description of the Related Art

A resin pellet-granulating machine includes a resin cutting knife (rotary blade) and a die plate, wherein nozzle holes are formed in a hardened surface provided on the die plate. In this structure, minute pellets are generated by rotating and sliding the resin-cutting knife on the hardened surface, while discharging a resin from the nozzle holes, to cut the resin.

(1) With respect to a die plate for such a granulating machine, Japanese Patent Laid-Open No. 5-124035 Publication discloses, as related arts, a structure in which recessed parts communicating with a resin passing nozzle are formed on the surface of a die base metal, a die surface hardened part (cemented carbide tip) by a preliminarily formed annular cemented carbide is provided in each recessed part, and the annular cemented carbide is adhered and fixed to the die base metal by brazing (FIG. 9 and Paragraph No. 0003 of Japanese Patent Laid-Open No. 5-124035 Publication).

(2) Japanese Patent Laid-Open No. 5-124035 Publication also discloses, as related arts, a structure in which a die surface hardened part is formed by thermally spraying a tungsten carbide-based self-soluble alloy with wear resistance in a predetermined thickness on to the surface of a die base metal having a plurality of resin passing nozzles (FIG. 8, Paragraph No. 0002 of Japanese Patent Laid-Open No. 5-124035 Publication).

(3) Japanese Patent Laid-Open No. 5-124035 Publication further discloses, as related arts, a structure in which a die surface hardened part composed of a titanium carbide (TiC) sintered plate of a predetermined thickness is formed on the surface of a die base metal (FIG. 10 and Paragraph No. 0004 of Japanese Patent Laid-Open No. 5-124035 Publication).

(4) A manufacturing method proposed by Japanese Patent Laid-Open No. 5-124035 Publication for the above-mentioned (1)-(3) comprises the steps of filling a powdery alloy of a component for forming a hardened layer in the recessed parts formed on the surface of the die base metal, and press-sintering the powdery alloy by means of hot isostatic pressurization (HIP) to form the die surface hardened part. Japanese Patent Laid-Open No. 5-124035 Publication describes that according to this, the die plate hardened part is integrated with the base metal by diffusion-bonding to exhibit a strong adhesive force. The strong adhesive force can prevent cracking or peeling of the die plate hardened part even if an operation extends over a long period.

[1] In the structure as shown in FIG. 9 of Japanese Patent Laid-Open No. 5-124035 Publication, however, a lot of base metal exposed parts are formed on the surface of the die in positions between tips. Accordingly, the base metal exposed parts are selectively worn by sliding the resin-cutting knife on the die surface. The wearing of the base metal is apt to cause dropping-off of the tips. Further, since one cemented carbide tip has one nozzle hole (so-called single-hole type tip), and such tips are arranged at intervals, the freedom in arrangement of nozzle holes on the die surface is low, and it is difficult to enhance the production efficiency by increasing the number of nozzle holes. In the single-hole type tip, brazing of a number of tips is required to form a number of nozzle holes. Accordingly, a tip-to-base metal or tip-to-tip (so-called boundary part) brazing exposed part is increased. Since a brazing filler metal is gradually lost by cavitation and corrosion, the dropping-off of the tips is easily caused by the loss of the brazing filler metal in a structure having many brazing parts.

[2] When the die surface hardened part is formed by thermally spraying the self-soluble alloy as in FIG. 8 of Japanese Patent Laid-Open No. 5-124035 Publication, the die surface hardened part can be formed only in a thickness of about 0.5-2 mm. The small thickness leads to shortening of the working life. Japanese Patent Laid-Open No. 5-124035 Publication also points out the effect that the life expires about 1 year. It is also difficult to obtain a uniform sprayed coating.

[3] In the structure in which the die surface hardened part is formed by the sintered plate of titanium carbide (TiC) as in FIG. 10 of Japanese Patent Laid-Open No. 5-124035 Publication, since the fixation of TiC of a wide area is technically difficult, a method for enhancing the hardness of a hardened surface, for example, by precipitation hardening treatment must be adapted. The precipitation hardening treatment is undergone after TiC is fixed and integrated to the die plate base metal by brazing, and nozzle holes are bored in a part which forms the hardened surface. Accordingly, a large number of processes are required.

On the other hand, although TiC alloy single-hole tips about 10 by 10 mm square may be brazed as many as nozzle holes, this method has a large number of processes similarly to the above method. And the cost necessary for working the single-hole tips is also increased because one-by-one brazing of the tips. In the structure in which one nozzle is provided in one tip and such tips are arranged at intervals, the freedom in the arrangement of nozzle holes on the die surface is low similarly to the above-mentioned (1).

[4] The method proposed by Japanese Patent Laid-Open No. 5-124035 Publication requires the formation of recessed parts for filling the powdery alloy on the surface of the base metal, and the hardened part cannot be formed in a very large size. Accordingly, in order to form many nozzles, a number of relatively small recessed parts must be formed in the base metal. Consequently, many base metal exposed parts are formed in the boundaries between recessed parts as shown in FIGS. 3 and 6 of Japanese Patent Laid-Open No. 5-124035 Publication, and the base metal exposed parts are selectively worn by sliding the resin-cutting knife on the die surface to easily cause the dropping-off of the tips.

SUMMARY OF THE INVENTION

In view of the above-mentioned circumstances, the present invention has an object to provide a die plate, which has high freedom in an arrangement of nozzle holes to enable a close arrangement of a number of nozzle holes, has an extended life with hardly causing dropping-off of a member constituting a hardened surface, and can be produced with a minimized number of processes.

The problems to be solved by the present invention are as described above, and means for solving the problems and the effect thereof will be described.

Namely, the present invention provides a die plate having a hardened surface, the hardened surface being formed by diffusion-bonding a plurality of WC (tungsten carbide) alloy plates to a base metal, and each of the WC alloy plate having a plurality of nozzle holes.

According to this structure, a plurality of nozzle holes are arranged on one WC alloy plate, whereby the pitch between nozzle holes can be minimized. Accordingly, a larger number of nozzle holes can be closely arranged more than in a tip type die plate of the same size (the die plate shown in FIG. 9 of Japanese Patent Laid-Open No. 5-124035 Publication). Consequently, the productivity of pellets is improved. The life of the hardened surface can be extended, in comparison with the structure by thermally spraying a self-soluble alloy (FIG. 8 of Japanese Patent Laid-Open No. 5-124035 Publication), and the necessary frequency of maintenance can be reduced.

Since a joint part in a boundary between plates can be minimized more than in the tip type die plate (the die plate shown in FIG. 9 of Patent Japanese Patent Laid-Open No. 5-124035 Publication), peeling and dropping-off of the plates by cavitation and corrosion can be prevented. Further, since exposed parts of the base metal can be minimized, selective wear of the base metal is hardly caused, whereby the peeling and dropping-off of the plates can be less likely to occur.

In the diffusion-bonding applied in the present invention, the WC alloy plate and the base metal are bonded by diffusing atoms of the WC alloy plate and those of the base metal with each other in high temperature and high pressure. Accordingly, the bonding strength can be improved.

In the brazing of FIG. 9 of Patent Japanese Patent Laid-Open No. 5-124035 Publication, the bonding force relies mainly on physical bonding force by melting of the surface and the bonding is not by diffusion-bonding.

In the above-mentioned die plate, preferably, the base metal is composed of SUS steel, and each of the WC alloy plates has a shape having at least two adjacent edges 20 mm or more in length.

In a WC alloy plate having such a shape, since the freedom in the arrangement of nozzles is increased without limitation of the number of holes, the close arrangement of a number of nozzle holes to one plate can be facilitated. Accordingly, the productivity of pellets is further improved. Since the base metal is composed of SUS steel, the life can be extended even if used in a water chamber (an underwater cut type granulating machine) with excellent wear resistance.

In the above-mentioned die plate, preferably, the base metal is composed of SUS steel, and each of the WC alloy plates is 200 mm or less in length of each edge and 2.5 mm or more in thickness.

According to this structure, warping of the WC alloy plates can be minimized to prevent a bonding failure to the base metal or a reduction in yield of the plates. Since the base metal is composed of SUS steel, the life can be extended even if used in a water chamber (a granulating machine of underwater cut type) with excellent corrosion resistance.

In the above-mentioned die plate, each of the WC alloy plates is preferably composed of an alloy containing 20-90 wt % of WC.

Namely, the WC alloy plates as described above are excellent in wear resistance, compared with other alloys such as TiC (titanium carbide) and NbC (niobium carbide). Accordingly, a die plate excellent in sliding wear resistance to the knife for cutting a resin discharged through the nozzle holes and cavitation erosion resistance can be provided.

In the above-mentioned die plate, each of the WC alloy plates is preferably protruded from the base metal by 1.5 mm or more.

According to this structure, since the resin-cutting knife is separated 1.5 mm or more from the exposed part of the base metal, the contact of the base metal with the knife can be surely avoided. Therefore, the selective wear of the base metal can be surely avoided to make the peeling and dropping-off of the plates less likely to occur.

DESCRIPTION OF THE PREFERRED EMBODIMENTS

A manufacturing process of a die plate as one desirable embodiment of the present invention will be described in reference to FIGS. 1-4.

Figure 1:
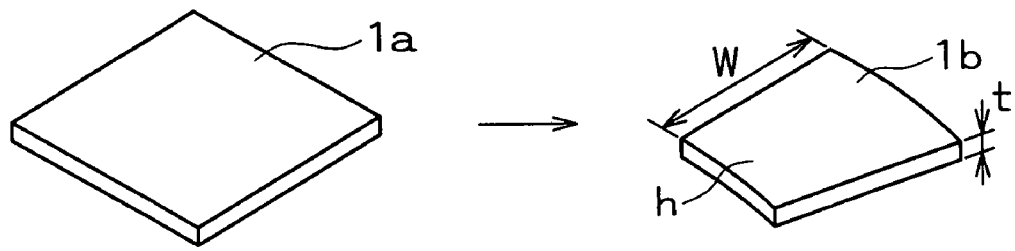
FIG. 1 is a perspective view showing the aspect of molding a WC alloy plate.

As shown in FIG. 1, a plate of WC alloy (tungsten carbide alloy) is molded into a proper size (e.g., 200 mm×200 mm), and the WC alloy plate 1a is wire-electro discharge cut into a shape capable of being arranged on a die plate, and ground to a predetermined thickness.

The WC alloy plate 1a used in this embodiment is formed of an alloy containing 20-90 wt % of WC. This alloy is excellent in wear resistance in comparison with other alloys such as TiC (titanium carbide) and NbC (niobium carbide). Accordingly, a die plate excellent in sliding wear resistance to the knife for cutting a resin discharged from nozzle holes and in cavitation erosion resistance can be provided. WC—Co system alloy, WC—Ni system alloy, WC—Ni—Cr system alloy and so on can be used as the WC alloy.

Denoted at 1b in FIG. 1 is a WC alloy plate after grinding. In this embodiment, the molded WC alloy plate 1b has a maximum length W of one edge of 90 mm and a thickness t of 3.5 mm. A plurality of such WC alloy plates 1b are produced. As shown in the lower side of FIG. 2, an annular recessed part r of a predetermined depth is provided on a base metal 2b side. The base metal 2b is preferably composed of SUS steel since it exhibits excellent corrosion resistance even in the use of the die plate in a water chamber (an underwater cut type granulating machine).

Figure 2:
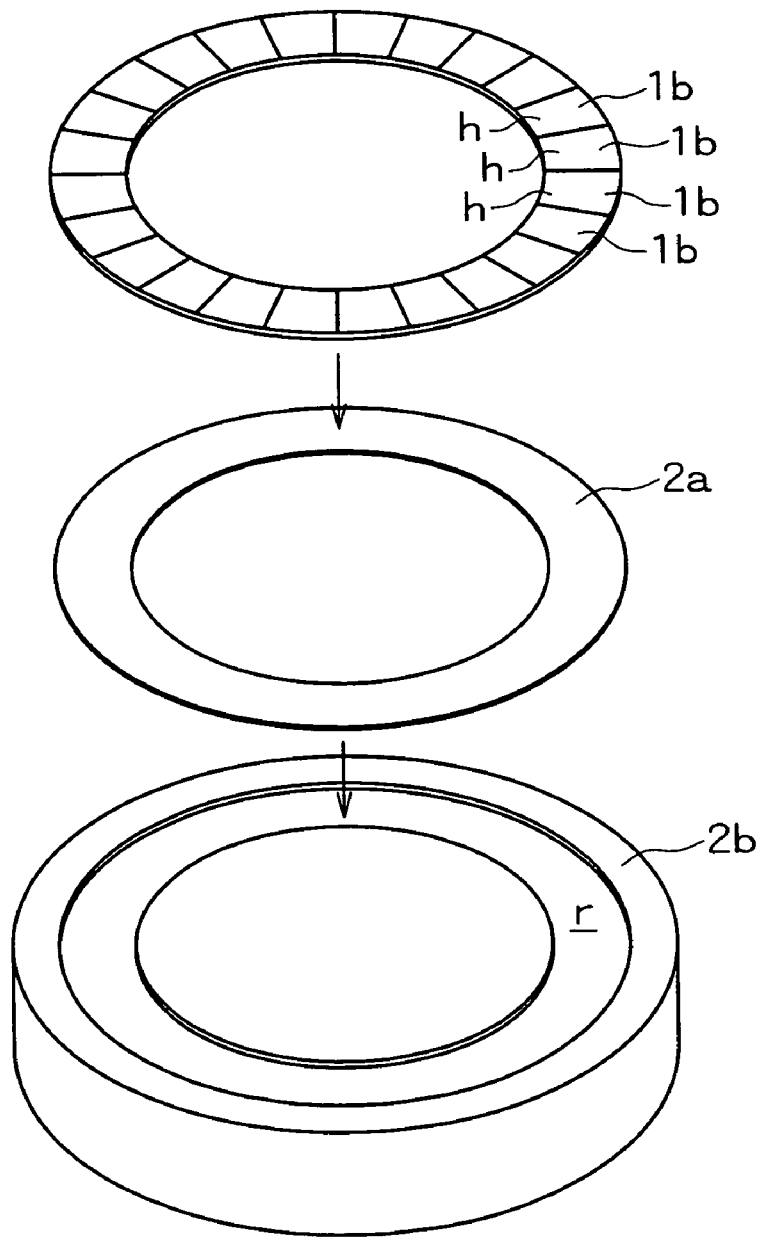
FIG. 2 is a perspective view showing the aspect of brazing the WC alloy plate to a base metal.
Figure 3:
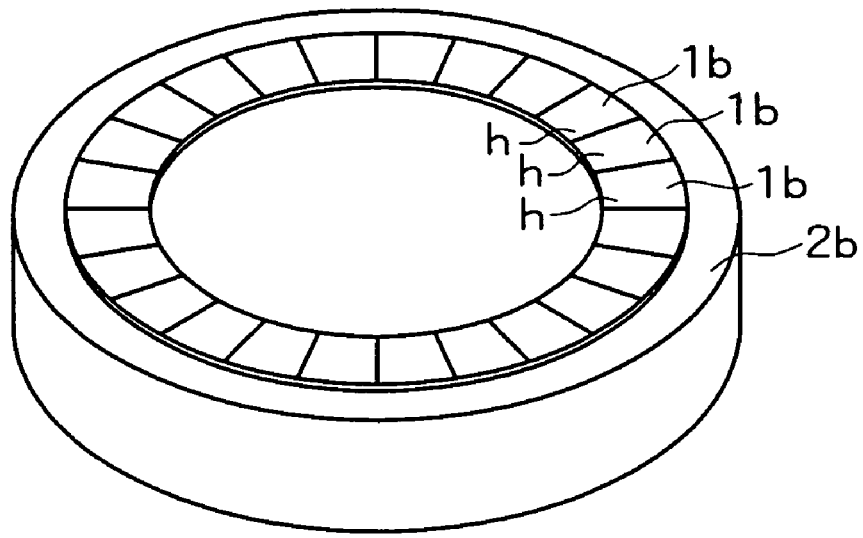
FIG. 3 is a perspective view showing a state in which the WC alloy plate is bonded to the base metal.

As shown in FIG. 2, a plurality of the WC alloy plates 1b are annularly arranged in the recessed part r of the base metal 2b so as to form no substantial clearance between the adjacent WC alloy plates. A brazing filler metal 2a is interposed between the bottom of the recessed part r and the WC alloy plates 1b. The resulting die plate is put in a vacuum furnace, heated at a predetermined temperature for a predetermined time, and then cooled. According to this, a die plate is obtained in which the WC alloy plates 1b are diffusion-bonded and integrated to the base metal 2b through the brazing filler metal. The upper surface of the WC alloy plate 1b forms a hardened surface h on which the resin cutting knife is slidable (FIG. 3). The "to form no substantial clearance between the WC plates" means not that no slight brazing filler metal layer is present between the WC alloy plates but that no joint of the base metal is present. As the brazing filler metal 2a, a conventional brazing filler metal comprising mainly, for example, gold, silver, nickel, or copper can be used.

In this embodiment, the diffusion bonding by the brazing filler metal 2a is adapted as a bonding means of the WC alloy plates 1b to the base metal 2b. However, a diffusion bonding by a known HIP method is also adaptable by interposing an intermediate layer. A conventional brazing filler metal which is used for the brazing filer metal 2a above can be applied to the intermediate layer.

Figure 4:
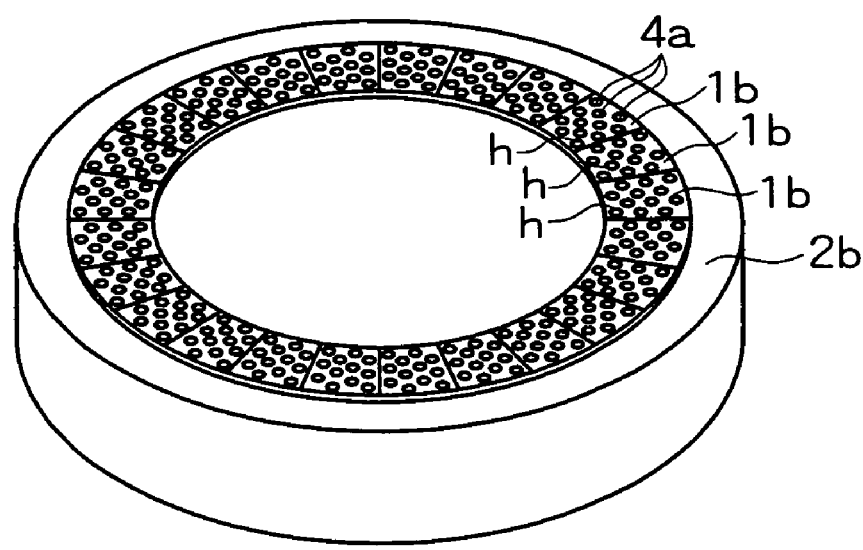
FIG. 4 is a perspective view showing an aspect in which nozzle holes are formed.

Further, nozzle holes 4a with a predetermined number and predetermined positions are formed relative to one WC alloy plate of the die plate by electric discharge machining. Since the WC alloy plate 1b is formed in a shape having at least one edge of 20 mm or more (90 mm) as shown in the above, a plurality of nozzle holes 4a can be formed relative to one WC alloy plate 1b, and the freedom in the arrangement of the nozzle holes 4a can be enhanced to facilitate the close arrangement of the nozzle holes 4a, 4a . . . as shown in FIG. 4.

Nozzle holes (not shown), which form resin inlet sides, are formed on the base metal 2b from the opposed side of the WC alloy plate-bonded surface. The surfaces (hardened surface h) of the WC alloy plates 1b are finish-ground to complete the die plate.

In the thus-constituted die plate, the pitch between the nozzle holes 4a can be minimized by arranging a plurality of nozzle holes 4a on one WC alloy plate 1b, and a larger number of nozzle holes 4a can be closely arranged more than in a single-hole tip type die plate of the same size (a die plate having a brazed part (brazing filler metal layer) between tips). Consequently, the productivity of pellets is improved. The life of the hardened surface h can be extended and the necessary frequency of maintenance can be reduced, in comparison with the structure in which the self-soluble alloy is thermally sprayed (FIG. 8 of Japanese Patent Laid-Open No. 5-124035 Publication).

A member to be bonded to the base metal can be reduced more than in the single-hole tip type die plate. Namely, by forming a plurality of nozzle holes 4a relative to one WC alloy plate 1b, the number of the WC alloy plates 1b can be reduced. This means that the number of processes can be reduced. Since the number of the WC alloy plates 1b can be reduced, the brazing part (brazing filler metal layer) in the boundary of the adjacent WC alloy plates 1b can be significantly reduced more than the single-hole tip type die plate. Accordingly, the peeling and dropping-off of the WC alloy plates 1b by the cavitation erosion of the brazing part (brazing filler metal layer) in the operation of the granulating machine can be prevented.

In the pressure sintering method of the powdery alloy disclosed in Japanese Patent Laid-Open No. 5-124035 Publication, it is necessary to form a number of recessed parts on the base metal to ensure a large number of nozzle holes, because the recessed parts for filling the powdery alloy cannot be enlarged much. In this embodiment in comparison, one large recessed part r continued in an annular shape is formed, and a plurality of WC alloy plates 1b are arranged without a substantial clearance (base metal joint part), whereby the plates can be brazed at once. Accordingly, the number of processes can be reduced. Since no exposed part of the base metal 2b is present, no selective wear of the base metal by sliding of the resin-cutting knife occurs in the operation of the granulating machine. Therefore, the peeling and dropping-off of the WC alloy plates 1b are never caused. The brazing here is applied to bonding between adjoining WC alloy plates, that is, to not pressurized bonding portion.

Although the dimension and shape of each WC alloy plate 1b are variously considerable, the WC alloy plate preferably has a shape having two adjacent edges 20 mm or more in length each. According to this, a plurality of nozzle holes 4a can be easily formed on one WC alloy plate 1b, and the freedom in the arrangement of the nozzle holes 4a, 4a . . . can be enhanced to facilitate the close arrangement of a larger number of the nozzle holes 4a. It should be noted that the maximum edge length is preferably 200 mm or less (in other words, each edge is preferably 200 mm or less in length). In a WC alloy plate having a general thickness, e.g., 3 mm, when the edge length exceeds 200 mm, the plate is apt to be warped. The warp of the plate might cause a bonding failure to the base metal 2b or a reduction in yield. The thickness t of the WC alloy plate 1b is preferably set to 2.5 mm or more for an extension of the life.

Since the depth of the recessed part r of the base metal 2b shown in FIG. 2 is smaller than the thickness t of the WC alloy plate 1b, the WC alloy plate 1b bonded to the base metal 2b is slightly protruded from the upper surface of the base metal 2b. According to this embodiment, the depth of the recessed part r is less than 2 mm against the thickness of the WC alloy plate 1b of 3.5 mm. Consequently, the WC alloy plate 1b is protruded from the upper surface of the base metal 2b by 1.5 mm or more. According to this, since the resin-cutting knife which slides on the hardened surface h is separated 1.5 mm or more from the exposed part of the base metal 2b, the contact of the base metal 2b with the knife can be surely avoided. Therefore, the selective wear of the base metal 2b can be surely avoided, and the peeling and dropping-off of the WC alloy plates 1b resulted from the selective wear can be eliminated.

What is claimed is:

1. A die plate comprising:
   a base metal part; and
   a hardened surface,
   wherein said hardened surface comprises a plurality of WC alloy plates diffusion bonded to the base metal part, and wherein each of said WC alloy plates comprises a plurality of nozzle holes,
   wherein said base metal part is composed of SUS steel, and each of said WC alloy plates is composed of an alloy containing 20-90 weight percent of WC and has a shape having at least two adjacent edges 20 mm or more in length and 2.5 mm or more in thickness.

2. A die plate comprising:
   a base metal part; and
   a hardened surface,
   wherein said hardened surface comprises a plurality of WC alloy plates diffusion bonded to the base metal part, and wherein each of said WC alloy plates comprises a plurality of nozzle holes, wherein said base metal part is composed of SUS steel, and each of said WC alloy plates is composed of an alloy containing 20-90 weight percent of WC and is 200 mm or less in length of each edge and 2.5 mm or more in thickness.

3. The die plate according to claim 1, wherein each of said WC alloy plates is protruded by 1.5 mm or more from said base metal part.

4. The die plate according to claim 2, wherein each of said WC alloy plates is protruded by 1.5 mm or more from said base metal part.

* * * * *

UNITED STATES PATENT AND TRADEMARK OFFICE
CERTIFICATE OF CORRECTION

PATENT NO. : 7,311,514 B2 Page 1 of 1
APPLICATION NO. : 11/076876
DATED : December 25, 2007
INVENTOR(S) : Osamu Tatsuda et al.

It is certified that error appears in the above-identified patent and that said Letters Patent is hereby corrected as shown below:

On the title page, Item (73), the Assignee is incorrect. Item (73) should read as follows:

-- (73) Assignee: Kabushiki Kaisha Kobe Seiko Sho (Kobe Steel, Ltd.), Kobe-shi (JP) --

Signed and Sealed this

Fifteenth Day of April, 2008

JON W. DUDAS
*Director of the United States Patent and Trademark Office*